(12) United States Patent
Anisimov et al.

(10) Patent No.: US 8,117,538 B2
(45) Date of Patent: Feb. 14, 2012

(54) METHOD FOR DYNAMICALLY CONVERTING VOICE XML SCRIPTS INTO OTHER COMPATIBLE MARKUP LANGUAGE SCRIPTS BASED ON REQUIRED MODALITY

(75) Inventors: Nikolay Anisimov, Concord, CA (US); Petr Makagon, San Francisco, CA (US); Andriy Ryabchun, Mill Valley, CA (US); Mark Scott, Willowdale (CA)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 599 days.

(21) Appl. No.: 12/339,904

(22) Filed: Dec. 19, 2008

(65) Prior Publication Data
US 2010/0162101 A1    Jun. 24, 2010

(51) Int. Cl.
*G06F 17/00* (2006.01)
(52) U.S. Cl. ...................................................... 715/239
(58) Field of Classification Search .................. 715/235, 715/236, 237, 239, 249, 201
See application file for complete search history.

(56) References Cited

U.S. PATENT DOCUMENTS

| | | | |
|---|---|---|---|
| 6,738,951 B1 * | 5/2004 | Weiss et al. | 715/239 |
| 7,287,248 B1 * | 10/2007 | Adeeb | 717/136 |
| 7,295,984 B2 * | 11/2007 | Glynn | 704/270.1 |
| 7,685,135 B2 * | 3/2010 | Brooke et al. | 707/999.1 |
| 2002/0198719 A1 * | 12/2002 | Gergic et al. | 704/270.1 |
| 2003/0121002 A1 * | 6/2003 | Goose et al. | 715/513 |
| 2003/0182305 A1 * | 9/2003 | Balva et al. | 707/103 R |
| 2004/0019638 A1 * | 1/2004 | Makagon et al. | 709/204 |
| 2004/0172254 A1 * | 9/2004 | Sharma et al. | 704/270.1 |
| 2006/0233326 A1 * | 10/2006 | Erhart et al. | 379/88.16 |
| 2007/0041525 A1 * | 2/2007 | Tingley et al. | 379/88.17 |

* cited by examiner

*Primary Examiner* — Laurie Ries
(74) *Attorney, Agent, or Firm* — Donald R. Boys; Central Coast Patent Agency, Inc.

(57) ABSTRACT

In a contact center, a routing interface for enabling redirection of interactions from one scripted resource type to another includes a language transformation engine executable from a browser application resident on a digital medium installed on or accessible to a computing appliance, and an interactive panel accessible through the browser application the panel containing selectable modality options. The language transformation engine has network access to a language server, and a routing strategy server, and wherein VXML scripts downloaded to the browser are transformed into scripts expressed in another markup language for presentation and wherein the transformed scripts are used at an end resource that the interaction is redirected to.

12 Claims, 5 Drawing Sheets

METHOD FOR DYNAMICALLY CONVERTING VOICE XML SCRIPTS INTO OTHER COMPATIBLE MARKUP LANGUAGE SCRIPTS BASED ON REQUIRED MODALITY

BACKGROUND OF THE INVENTION

1. Field of the Invention

The present invention is the in the field of telecommunications including dynamic voice recognition and speech rendering, and pertains particularly to methods for dynamically converting VoiceXML into other compatible markup languages based on required modality.

2. Discussion of the State of the Art

In state-of-art contact centers processing of incoming calls from customers typically involves interactive voice response (IVR) processing and/or live voice conversation with an agent of the center. IVR interaction dialog prompts are typically provided by the IVR system as synthesized speech rendered from voice XML script using a text-to-speech engine. Responses from customers are typically recognized by the speech engine and rendered to text for contact center application. Agent scripts are built using graphics user interface (GUI)-based tools. Therefore, both types of dialogs are created separately using different languages markup and tools.

IVR scripts and agent scripts dialogue types have several features in common. Both dialog types are directed to customers of the contact center. Both dialog types use contact center (CC) data. Both dialog types seek to provide information to or extract information from a customer. In a case where the IVR system is very "smart" a customer may not distinguish between synthesized speech and human speech because natural language technology is used. In natural language technology, the IVR recognizes natural customer speech and responds accordingly using dynamically created IVR scripting.

It has occurred to the inventors that it would be desirable to be able to dynamically switch dialog on the contact center side from dynamically created IVR scripting to agent scripting and back. However, because of differences in language construction, agent scripting cannot simply be substituted for IVR scripting. Some attempts have been made to develop abstract dialog management languages that have different presentation transformation capabilities, but a problem with this approach is in creating required abstraction in the language and managing complexity of the language.

What is clearly needed is a system and methods for dynamically converting voice XML scripting into other compatible markup language scripting based on required modality at the time of conversion.

SUMMARY OF THE INVENTION

A problem stated above is that it is desirable in a contact center to be able to dynamically redirect interaction events from one scripted resource type to another scripted resource type, but conventional means for language transformation that would support such interaction redirect operations lack flexibility and dynamicity. Creating the required language abstraction for a transformation base and managing the complexities of the created language are challenges that remain.

Therefore, the inventors searched functional elements of telephony and voice enabled interactive systems looking for elements that could be combined to create a system that could redirect and translate script dynamically and accurately without creating a new language.

The inventors realized in an inventive moment that if at the point of interaction with a first scripted resource, a caller could be switched to another modality and scripting could be transformed on the fly between the modalities then significant flexibility might result in interaction handling. The inventor therefore constructed a unique routing interface and script transformation system for that allowed interactions to be redirected from one scripted resource to another using an existing abstract language base for scripts. A significant flexibility in routing results, with no complexity or management problems related to creating a new markup scripting language.

Accordingly in one embodiment of the invention, in a contact center, a routing interface for enabling redirection of interactions from one scripted resource type to another is provided comprising a language transformation engine executable from a browser application resident on a digital medium installed on or accessible to a computing appliance, and an interactive panel accessible through the browser application the panel containing selectable modality options.

The system is characterized in that the language transformation engine has network access to a language server, and a routing strategy server, and wherein VXML scripts downloaded to the browser are transformed into scripts expressed in another markup language for presentation and wherein the transformed scripts are used at an end resource that the interaction is redirected to.

In one embodiment, the first resource type is a voice application server connected to a voice extensible markup language based browser. In another embodiment the first resource type is a Web site connected to a voice extensible markup language based browser. In another embodiment, the first resource type is an agent connected to an agent browser through a computing appliance interface.

In one embodiment, the resources include but are not limited to live voice, synthesized voice, chat, instant messaging, and voice conference. In one embodiment the language server is an extensible style sheet language transformation (XSLT) server. In one embodiment the interface further includes an event notification window for indicating when a resource type switch should take place for an event in progress.

In one embodiment the language transformation engine is further configurable to access pre-transformed dialog scripts and to dynamically convert candidate scripts using available construct library. In a preferred embodiment the final routing destination includes but is not limited to an agent telephone, an agent chat, a conference bridge, an IVR, or an instant messaging interface.

According to another aspect of the invention, a method is provided for dynamically transforming a voice extensible markup language script into a script expressed in another compatible markup language, selection thereof triggered by required modality at the time of transformation comprising the steps (a) downloading from a voice sever, the voice extensible markup language script using an extensible markup-enabled browser, (b) downloading from an extensible style sheet language transformation server, a corresponding extensible style sheet language transformation script using the extensible markup-enabled browser, and (c) within the extensible markup-enabled browser, using the extensible style sheet language transformation script to transform the voice extensible markup language script into a script expressed in the desired extensible markup-based language.

In one aspect, in step (a) the extensible markup-enabled browser is also voice-enabled and is interacted with by a person using a telephone and the voice server is an interactive voice response server. In one aspect, in step (a) the extensible markup-enabled browser is an agent browser interacted with by an agent using a computing device.

In one aspect, in step (b) the correct corresponding extensible markup language script served defines the desired end language and contains or has access to the dialog constructs for that end language. In a preferred aspect in step (c) the correct dialog constructs are transformed and the dialog specific constructs in the original script are ignored. In one aspect in step (c) the desired extensible markup-based language is extensible hypertext markup language.

According to another aspect of the invention, in a contact center, a method for routing an interaction between one or more scripted resources is provided comprising the steps (a) from within a browser monitoring the interaction at a first scripted resource and determining to switch resource types, (b) within the browser, selecting and submitting a desired scripted resource for transferring the interaction to, and (c) transforming script styles from the style of the first resource to the style of the desired resource.

In one aspect of the method, in step (a) the determination is made by an automated process. In another aspect, in step (b) the selection is made from an interactive menu displayed in the browser window. In one aspect in step (c) the transformation occurs within the browser and the final scripting is presented to the user. In one aspect of the method the final scripting includes but is not limited to WML, XHTML, and CCXML.

DETAILED DESCRIPTION

The inventors provide a system and methods for converting VXML into other compatible markup languages within a VXML browser, wherein selection of the other markup language is dependent upon required modality. The present invention is described in enabling detail in the various embodiments to follow.

Figure 1:
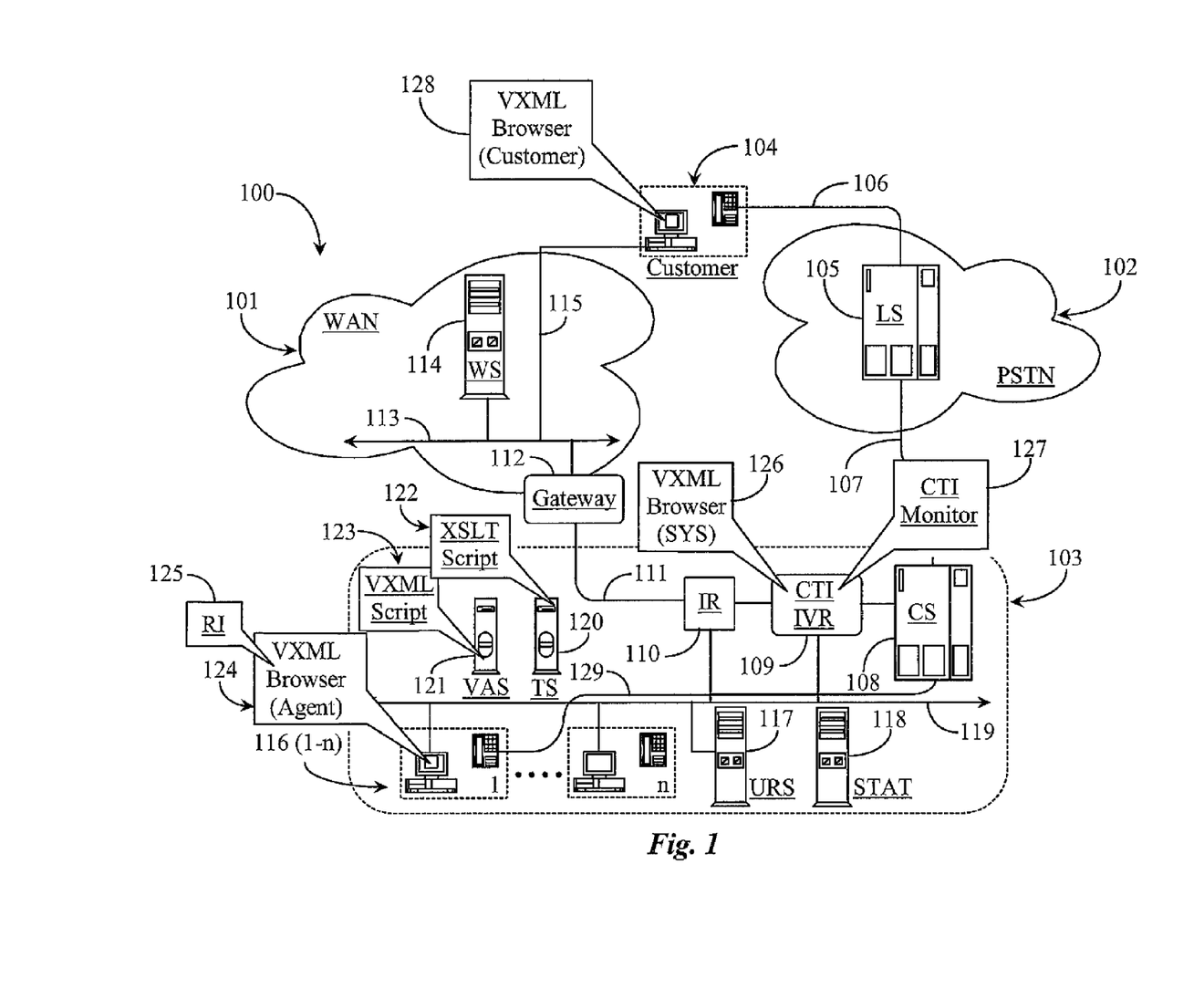
FIG. 1 is an architectural overview of a contact center environment where dynamic VXML script transformation is supported according to an embodiment of the present invention.

FIG. 1 is an architectural overview of a contact center environment 100 wherein dynamic VXML script transformation is supported according to an embodiment of the present invention. Contact center environment 100 in this example includes a wide area network (WAN) 101, a public switched telephone network (PSTN) 102, and a contact center (CC) 103.

WAN 101 may be a public or private wide-area-network without departing from the spirit and scope of the present invention. In one embodiment, WAN 101 is the well-known Internet network. Hereinafter in this specification, WAN 101 will be referred to as Internet 101 just for example purposes. Internet 101 is further exemplified by an Internet backbone 113. Internet backbone 113 represents all of the lines, equipment, and access points that make up the Internet network as a whole, therefore there are no geographic limitations to the present invention.

PSTN network 102 may be a public or private telephone network without departing from the spirit and scope of the present invention. Contact center 103 represents any communications center of an enterprise or organization that provides goods and services to customers. Contact center 103 includes a local area network (LAN) 119. LAN 119 is adapted for transfer control protocol/Internet protocol (TCP/IP). LAN 119 supports agent stations 116 (1-n). An agent station such as one of stations 116 (1-n) typically includes a personal computer (PC) and a telephone. There maybe many more stations than illustrated in this example within contact center 103 without the departing from the spirit and scope of the present invention. The inventor illustrates two agent stations and deems the illustration sufficient for the purpose of describing the present invention.

A customer station 104 is illustrated in this example. Customer station 104 includes a PC and a telephone. The telephone in customer station 104 is connected to a local telephone switch (LS) 105 within PSTN network 102 by way of a telephone line 106. The PC within customer station 104 is connected to Internet network 101 by way of an Internet access line 115. Internet access may include but is not limited to, cable-modem, dial-up, integrated services digital network (ISDN), digital subscriber line (DSL) and other such well-known systems.

Customer 104 may use an Internet-capable appliance other than the PC for connecting to Internet 101. For example, the PC maybe a laptop computer or a personal digital assistant (PDA). Moreover, the telephone and customer station 104 may be a cellular telephone or other communication device instead of a landline telephone. In one embodiment, the connecting network enabling customer 104 to access contact center 103 may be a time division multiplex (TDM) network over the Internet protocol (IP) network.

LS 105 within PSTN 102 is connected to a central office switch (CS) 108 within contact center 103 by a telephone trunk 107. LS 105 maybe an automatic call distributor (ACD). In one embodiment LS 105 is a private branch exchange (PBX). CS 108 may also be in ACD or a PBX switch. The telephones at each agent station are connected to switch 108 by internal telephone wiring 129. The computers at each agent Station 116 (1-n) are connected to LAN 119 directly.

CS 108 within contact center 103 is monitored and controlled in this embodiment by a computer telephony integration (CTI) server 109 having a digital medium installed thereon or accessible thereto connected to the switch by a CTI link. In this example, CTI server 109 includes an interactive voice response (IVR) server, which may be implemented on the same or a connected server. An Internet router (IR) 110 is provided within CC 103 and is connected directly to LAN 119. IR 110 has connection to an Internet gateway 112 by way of an Internet access line 111. Gateway 112 is connected to backbone 113 within Internet network 101. IR 110 is connected to CTI/IVR 109 for communication by a separate data link. In this example both nodes are connected directly to LAN 119.

A Web server (WS) 114 having a digital medium installed thereon or accessible thereto is provided within Internet network 101, and is coupled to backbone 113. WS 114 is adapted as an electronic data and information server for serving HTML pages of Web sites resident on and executable from the digital medium to visiting customers of contact center 103. Customer 104 may access Web Server 114 to visit a company Web site hosted by contact center 103. In one embodiment, customer 104 may use telephone 104 to access WS 114. In this case a call event from a customer may arrive at CS 108 within CC 103 to be initially treated by IVR 109.

A voice application server (VAS) 121 having a digital medium installed thereon or accessible thereto is provided within CC 103 and is connected directly to LAN 119. VAS 121 is adapted to serve voice applications containing VXML scripts 123 resident on and executable from the digital medium to IVR 109 for use in interaction with customers. More specifically, VAS 121 serves VXML documents also called VXML scripts to IVR 109 to play as speech to connected customers via a voice-enabled or VXML system browser 126. Browser 126 downloads VXML documents or scripts from VAS 121 and renders the VXML as synthesized speech for a customer registered at switch 108. There may be a variety of voice applications available through IVR 109, one of which may be an application that enables telephone browsing of a Web site hosted in WS 114 on Internet 101.

A CTI monitor 127 implemented within CTI/IVR 109 as a software or firmware interaction monitor is provided and reports to one or more agent stations the status of interaction at IVR 109. In this case agent station 116 (1) has a VXML agent browser 124 installed on a resident computer hard drive or other digital medium available to the computer at the station. VXML browser 124 has similar capabilities as VXML system browser 126. Agent VXML browser 124 is further enhanced by a routing interface (RI) 125. RI 125 is executable from within browser 124 and is operable by the agent as an interface from which to route calls engaged in interaction with IVR 109 to a live agent.

CTI monitor 127 reports directly to VXML agent browser 124 and interaction state information on one or more connected events appears in RI 125. In this example, agent browser 124 is adapted to receive and interpret VXML script. Moreover, agent browser 124 may receive VXML documents directly from VAS 121 instead of receiving them indirectly through CTI/IVR 109. In one embodiment of the present invention many or all call center agents may have a VXML-enabled browser enhanced with a routing interface such as VXML browser 125. In another embodiment the VXML-enabled browsers are available to all of the center agents but only a few may be enabled for routing interactions from automated attendance to live assistance.

A language transformation server (TS) 120 having a digital medium installed thereon or accessible thereto is provided within CC 103 and is connected to LAN 119. TS 120 is adapted to hold and serve extensible style sheet language transformation (XSLT) scripts illustrated herein as XSLT script 122 resident on and executable from the digital medium on or associated with the server. In one embodiment the XSLT scripts with VXML scripts or documents are stored and served by VAS 121. For example, for every VXML script of a voice application in server 121 there may be at least one corresponding XSLT script in TS 120. In one embodiment VXML scripting is dynamic and XSLT scripts are created in conjunction with VXML scripts and may or may not be used to transform VXML into another compatible markup language.

In one embodiment of the present invention, a customer version of a VXML (voice-enabled) browser 128 is provided to or otherwise resident on a hard drive or other digital medium available to the customer's computing appliance. The customer commuting appliance may be a Laptop computer, a cellular telephone, a PDA or some other appliance capable of navigating the Internet network.

In practice of the present invention in one embodiment, customer 104 may call CC 103 by placing a telephone call to LS 105 via line 106, trunk 107 and CS 108 to interact with CTI/IVR 109 for agent level routing or self-help treatment (through IVR). IVR functionality is characterized by interaction with VXML (SYS) browser 126 that accepts VXML script 125 from VAS 121 interprets the script and renders the script as synthesized speech dialog to the customer. The VXML script might be a pre-written or static script or a dynamically-built script.

While customer 104 is engaged in IVR interaction using VXML (SYS) browser 126, CTI monitor 127 reports interaction state information to agent station 116 (1) running VXML (agent) browser 124 enhanced with routing interface (RI) 125. With RI 125 open in the browser, the agent can see the current state of interaction of customer 104. If the While customer 104 is engaged in IVR interaction using VXML (SYS) browser 126, CTI monitor 127 reports interaction sate information to agent station 116 (1) running VXML (agent) browser 124 enhanced with routing interface (RI) 125. With RI 125 open in the browser, the agent can see the current state of interaction of customer 104.

To accomplish the switch, the agent may, using RI 125, select an option such as "take call", "route to me", or the like to cause VAS 121 to send VXML script to agent station 116(1), more particularly to VXML browser 124. The VXML script is interpreted by browser 124 but cannot in its current form be rendered in a manner such that the agent might read the script. Therefore, VXML browser 124 gets XSLT script served from TS 120 corresponding to the VXML script. A language transformation engine (not illustrated) installed in VXML browser 124 uses the XSLT script to transform the VXML script into a useful agent script. An agent script known to the inventor is extensible hypertext markup language (XHTML). The transformation focuses on dialog construct transformation but leaves voice-specific constructs alone in most cases. During the transformation process some XHTML-specific constructs can be added to the script that was not originally there.

In one embodiment the agent script resulting from the language transformation may be displayed as text on the computer screen of the PC in the agent station. At the same time that conversion of script occurs, the call may be transferred to the agent's telephone and the agent may pick up the call and read from the generated XHTML script at the same place that the call left off with the IVR. The caller may experience only a very slight, if any, delay and may not even realize a switch to a live agent has occurred. The agent may engage the caller live in this way as scripting is dynamically converted on the fly from VXML to XHTML in this case. If at any time the agent decides that the caller should go back to IVR treatment, the agent may transfer the call back to the IVR system.

The scripts may be adapted to also carry parameters of the call event and caller such that the sequence of script generation is not interrupted from system browser to agent browser and back to system browser again. In one embodiment an agent may determine to take the call from the IVR system and then transfer the call after some interaction to another agent running a VXML-enabled browser with a language transformation engine. As long as VAS 121 can follow the routing, then the VXML scripts will be available to the new end-routing point at the time of interaction.

RI 125 might rely also on universal routing strategies (URS) available from a URS server 117. RI 125 may also take into account information from a statistics (STAT) server 118. A monitoring agent or supervisor may see availability states and skill levels of other agents in the RI and drag and drop function such as dragging an interaction icon onto an agent icon within the interface accomplishes routing initiation to route the interaction to the affected agent.

In one embodiment, customer 104 may be equipped with a VXML browser 128. Browser 128 may, like the agent browser, accept VXML and render the scripting in another compatible scripting language. In this case the customer may go online and may connect to WS 114 and may access a Web site and browse pages. The Web site may contain one or more interactive scripts that rely on VXML dialog. VXML scripting from VAS 121 may be provided to VMXL browser 128 through a Web site in WS 114 or through VXML (SYS) browser 126 and the Web site.

VXML browser 128 may interpret and render the script to speech with text-to-speech functionality. In one embodiment the customer may have reason not to want speech through browser 128 and supporting hardware, but would rather prefer text in a text message or chat interface. In this case the VMXL (customer) browser may get XSLT script from server 120 and use it to convert the VXML dialog into a readable and displayable text. One with skill in the art will recognize that browser-interpreted script can be transformed into almost any compatible (XML-based) markup.

Figure 2:
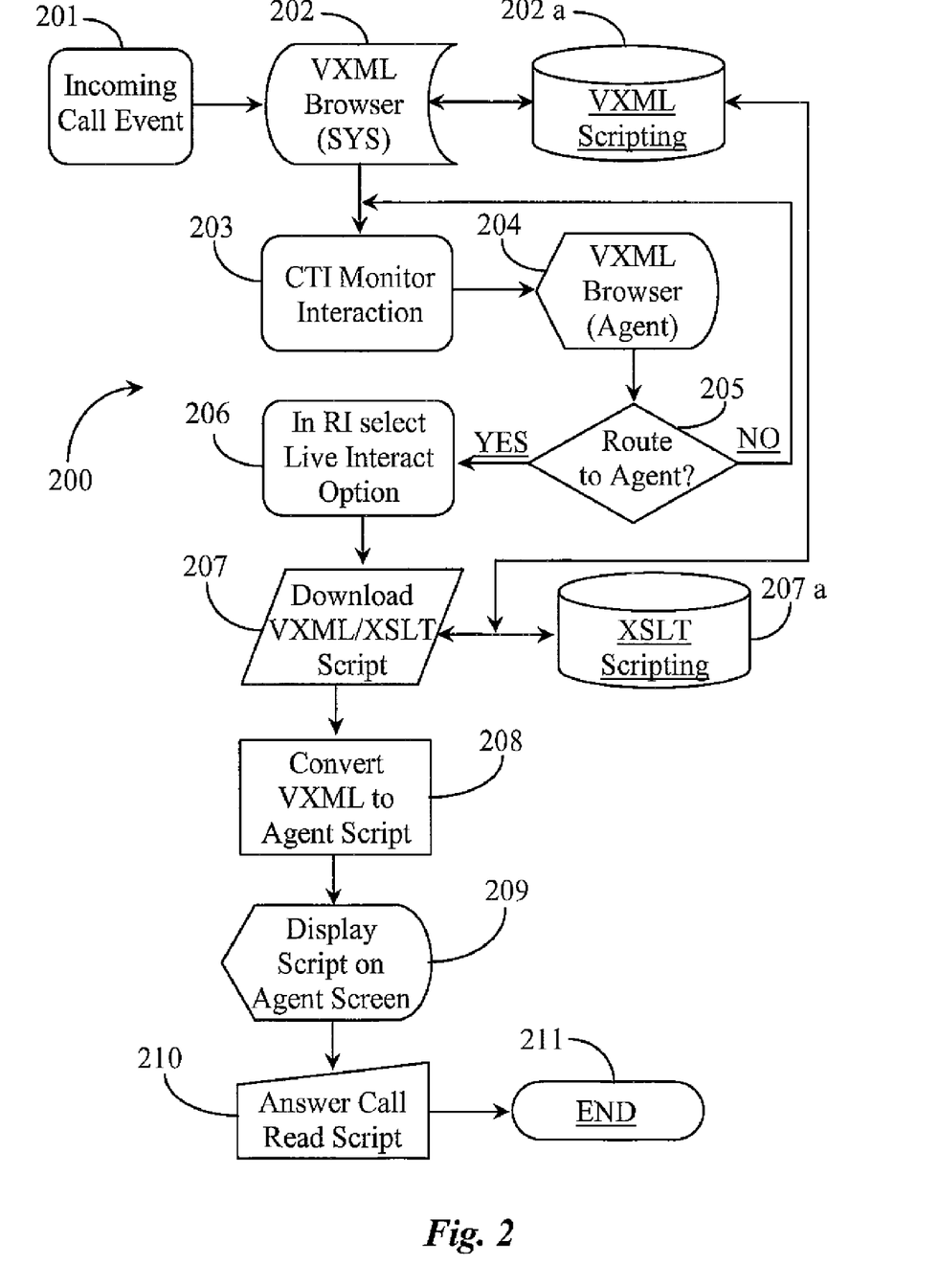
FIG. 2 is a flow chart illustrating steps 200 for switching of scripted resource types for a single interaction according to one embodiment of the present invention.

FIG. 2 is a flow chart 200 illustrating steps for switching of scripted resource types for a single interaction according to one embodiment of the present invention. At step 201 a call event registers at the call center switch and at step 202 the event is connected to IVR, or more particularly, to a system VXML browser. The VXML browser downloads VXML script from an application source illustrated herein as 202a.

At step 203 a CTI monitor application monitors the IVR interaction. At step 204 the monitor application reports state information to another VXML browser of an authorized agent. Reporting state information is ongoing. In this embodiment the agent operating the computer host of the VXML agent browser is in a position to route the interaction to a live agent based on monitored state of the interaction. There may be multiple interactions being monitored in this way at the same time. At step 205, the agent may make a decision to redirect the interaction to live assistance or to continue monitoring without action.

At step 205, if the agent decides not to re-direct the call event to a live agent, the agent does nothing and the process loops back to step 203 for continued monitoring of the interaction. If at step 205 the agent decides to re-direct the caller to live assistance, then at step 206 within the routing interface the agent selects a live interaction option. The selected option could redirect the caller to any available agent whose states may also be monitored within the router interface (RI). The call may be re-directed to the monitoring agent's telephone. At step 207 the VXML browser of the agent targeted for call re-direction at step 206 gets VXML script from the system browser (IVR) and at the same step the corresponding XSLT script is obtained by the browser through download from a language transformation server illustrated herein as XSLT scripting repository 207a.

At step 208 the VXML scripting is converted or transformed into agent scripting such as XHTML by a language transformation engine running in the browser. At step 209 the resultant agent scripting is displayed on a monitor available to the agent such as on a computer screen. At step 210 the agent may pick up the call and may read the script, which may follow the normal dialog flow of the running voice application. In this example the caller may experience a slight delay before the agent takes the call. At step 211 the process ends for that call. While interacting live with a caller the agent may continue re-directing other IVR callers to live agents as they become available.

It will be apparent to one with skill in the art that as a call is re-directed, routing strategy is invoked that handles the actual redirection or transfer of the caller from IVR to an agent queue. The VXML browser may receive the VXML scripts from the voice application server upon request or by push technology. In one embodiment instead of telephone interaction at step 210, the modality might be chat, instant message, or connection to a telephone conference. In the case of chat or instant message, the caller's speech is rendered into text through a VXML browser to the chat engine or the IM interface. Similarly, VXML script from the voice application may be rendered as text into the chat or IM interface for the agent's view but is rendered as synthesized voice for the connected caller using text to speech functionality available through the VXML browser.

Figure 3:
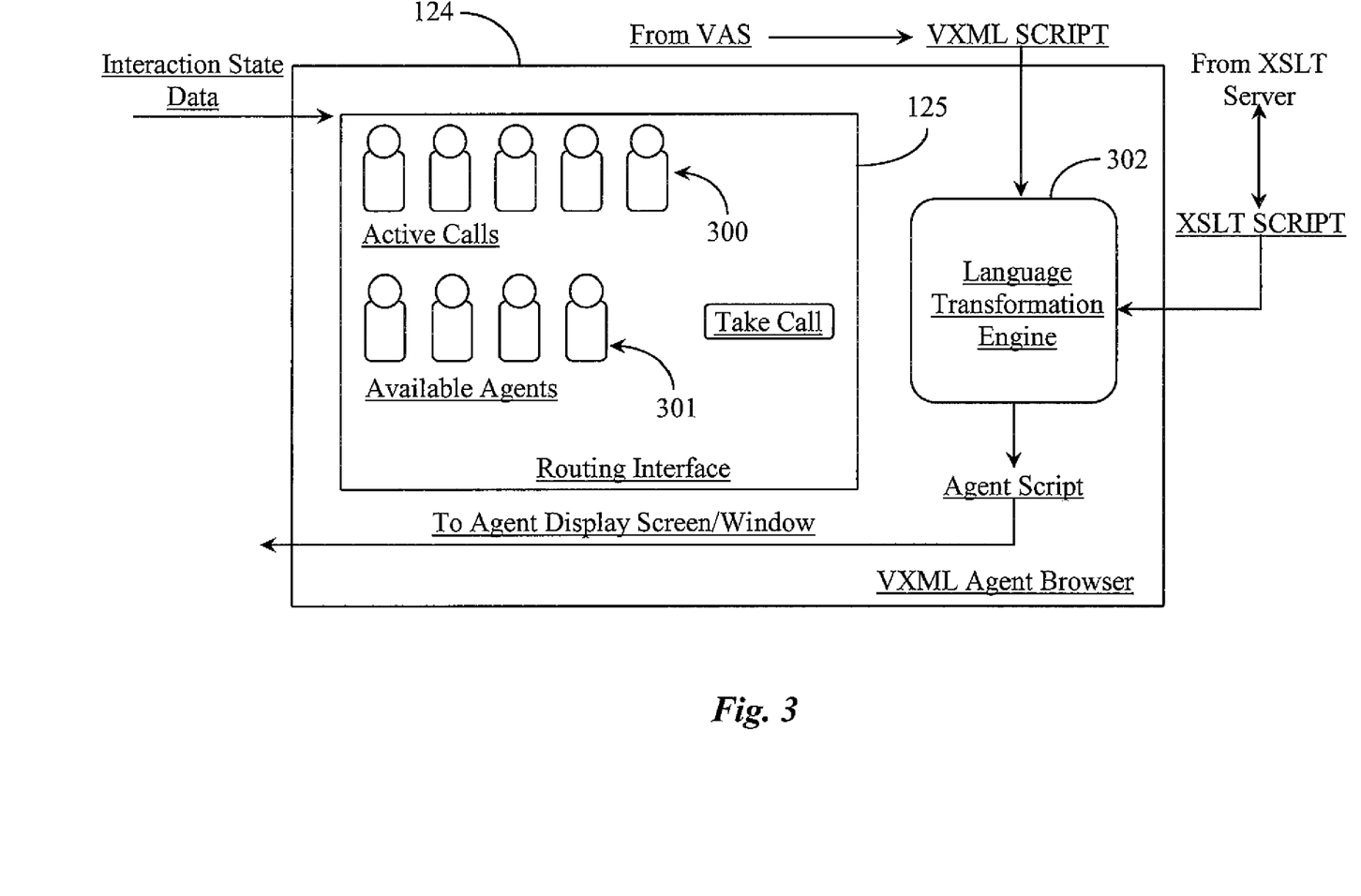
FIG. 3 is a block diagram illustrating VXML agent browser 124 of FIG. 1 according to an embodiment of the present invention.

FIG. 3 is a block diagram illustrating VXML agent browser 124 of FIG. 1 according to an embodiment of the present invention. Browser 124 includes routing interface 125 described above. RI 125 is open within the agent browser and is actively monitoring interaction and agent state. The interface may be visual and tactile such that re-direction may be accomplished by manipulation of icons representing active calls and available agents.

Active calls at the IVR system are represented by event icons 300 showing 5 active calls at the IVR system. Available agents in the system are represented by available agent icons 301 showing that there are 4 agents available. Further state information may be available by mousing over an agent icon, such skill level, for example, department, and the like. An operating agent may select one of the icons 300 and drag it over one of the agent icons to redirect a call. In one embodiment an icon for interactive live chat may be available for re-directing callers from IVR to chat. In one embodiment an icon representing a conference bridge may also be provided as a possible end-point of a redirect.

In this example an interactive option labeled "Take Call" is provided within RI 125 and adapted to re-direct a call to the operating agent's queue. The agent may select any one of the icons 301 and drop it over the option Take Call to accomplish redirection of the call from IVR to the agent. Interaction state data and agent state data is input into RI 125. A language transformation engine 302 is provided within VXML browser 124 and is adapted to transform IVR VXML to some other compatible XML-based markup like XHTML for example.

Language transformation engine (LTE) 302 receives VXML script from voice application server (VAS) and corresponding XSLT script from the XSLT server. LTE 302 may output agent script (XHTML) or other compatible scripts for user by another interface such as different live interactive systems. Agent script may be displayed for an agent to read on the screen or in a window running on the agent computer screen. The entire conversation between the agent and the customer may be live voice if the agent picks up a call and reads the transformed script over the telephone to the customer. In this case the customer experience is a seamless switch from self-help IVR to interaction with a live agent. The agent may also switch the call back to IVR at any time during the process.

If the caller is directed to a chat room, then the caller's speech is interpreted and rendered as text into the interface. Dialog in the chat coming from the agent scripting may be rendered as synthesized speech in the agent or system VXML browser and spoken back to the customer whom is still using a telephone handset or a cellular telephone. In one embodiment the customer may be equipped with a voice-enabled browser like VXML browser 128 of FIG. 1 installed as a lightweight version on the cellular telephone of the customer. In this case, the browser on the customer's cellular telephone may render the speech to text in a silent mode where the text is inserted into a chat dialog box of a text messaging system on the phone or a server-assisted chat room that the user is connected to using the cellular telephone. An example of this modality may be appropriate in such times that the customer requires silent interaction, for example, while in a meeting with others. There are many possibilities.

Figure 4:
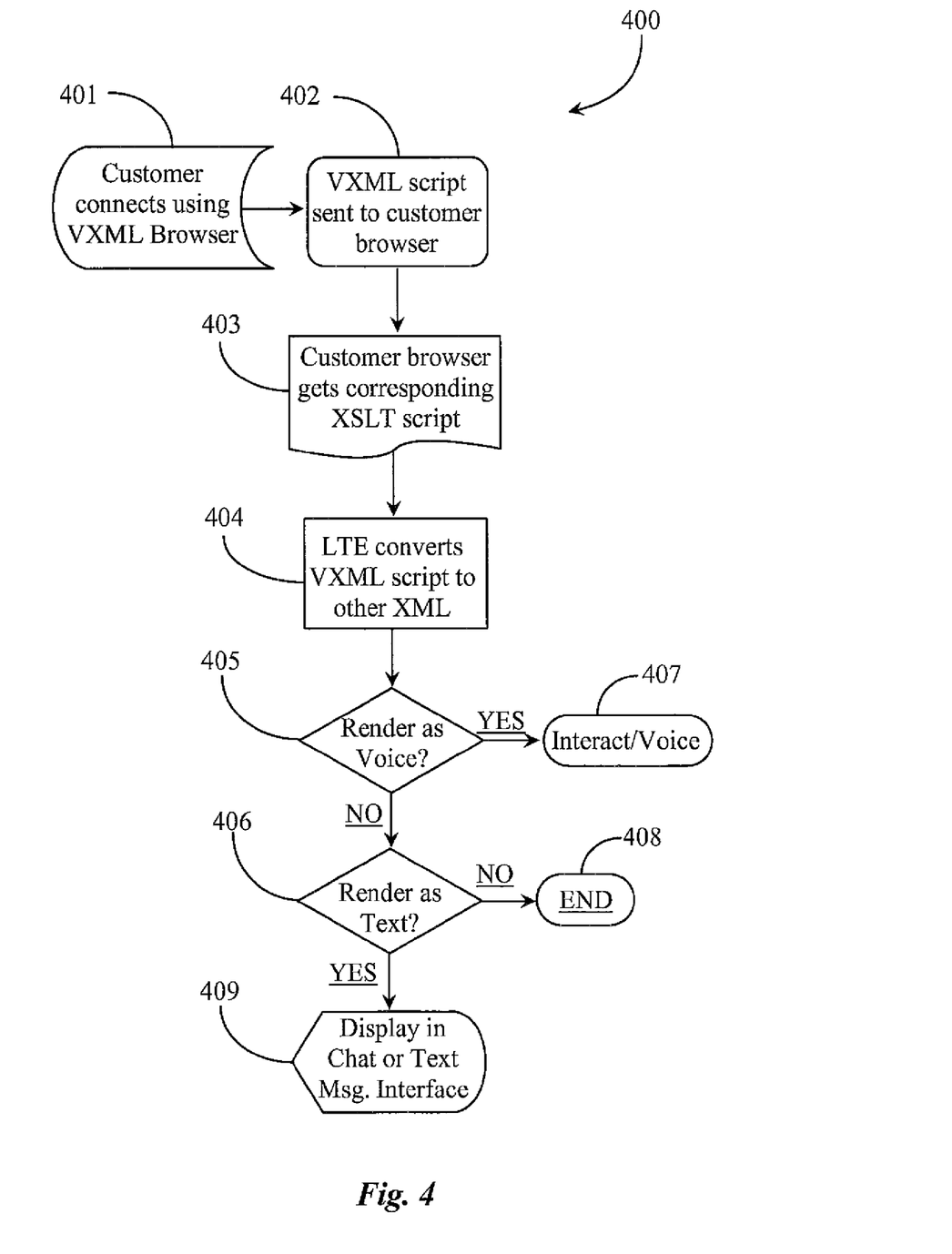
FIG. 4 is a process flow chart illustrating steps 400 for interacting with a customer according to another embodiment of the present invention.

FIG. 4 is a process flow diagram 400 illustrating steps for interacting with a customer according to another embodiment of the present invention. In one aspect of the invention, the customer may have a VXML browser installed locally like VXML browser 128 of FIG. 1. At step 401 the customer may connect to the contact center using a VXML browser, for example, connecting to a Web site interactive that presents voice dialog to the customer.

At step 402, the VAS sends VXML script to the VXML browser of the customer. At step 403 the customer browser may also get corresponding XSLT script from an XSLT server. At step 404 a language transformation engine (LTE) running in the customer browser converts the VXML to some other compatible markup using the XSLT script. In this example, the customer has an option of rendering the converted script as voice at step 405.

If the customer decides to render the script as synthesized voice at step 405, then at step 407 the interaction continues in live voice between customer and agent. If the customer decides not to render the script as voice then at step 406 the option arises of rendering the voice as text. If the customer decides against this the process may end at step 408 for that caller. If at step 406 the customer decides to render the VXML as readable text, the converted script may be input into a designated chat or texting interface.

Figure 5:
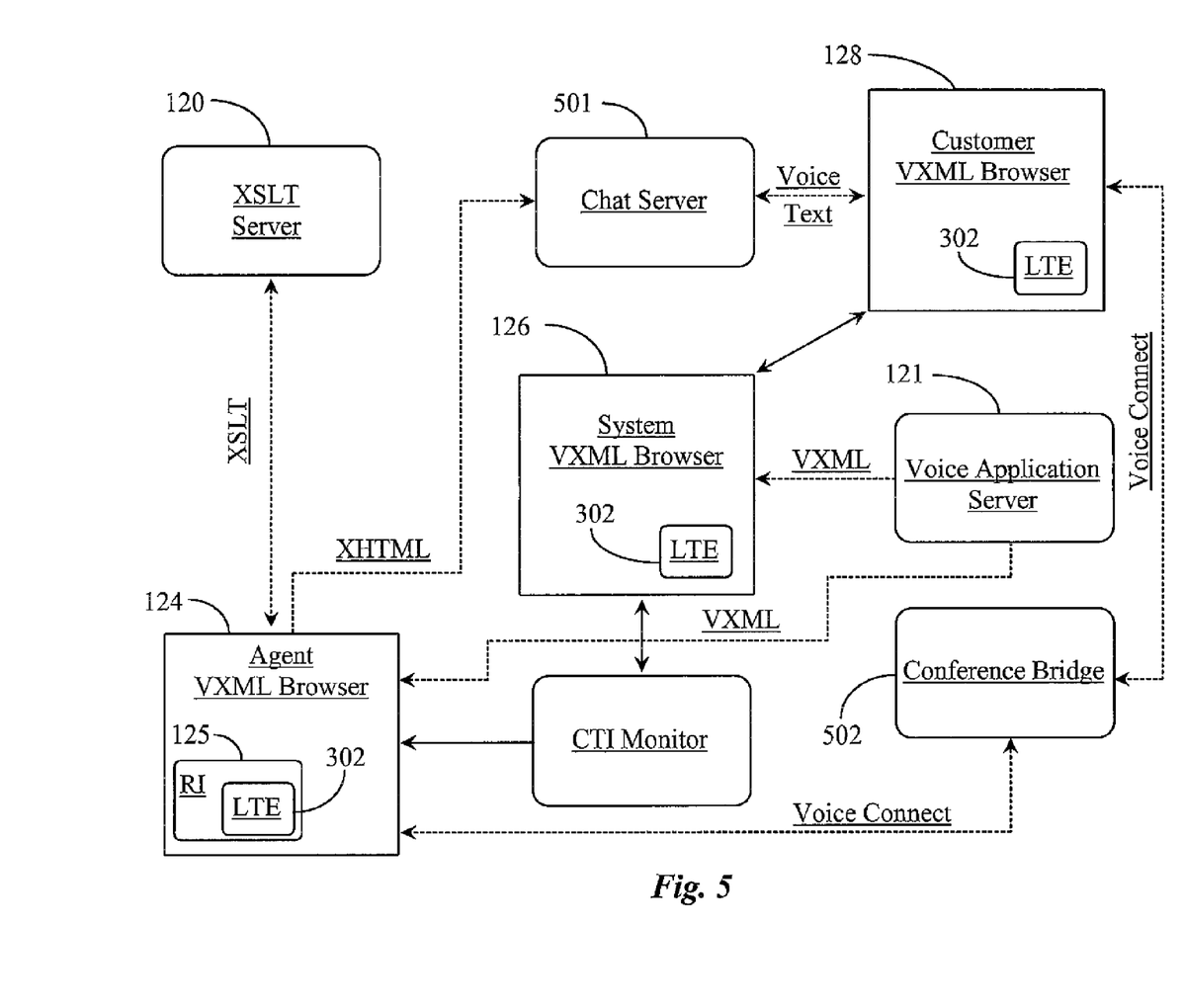
FIG. 5 is a block diagram illustrating logical redirection options for the routing interface according to an embodiment of the invention.

FIG. 5 is a block diagram illustrating logical redirection options for the routing interface according to an embodiment of the invention. In this example the possibility of three separate VXML browsers are illustrated including customer VXML browser 128, system VXML browser 126 and agent VXML browser 124. In one embodiment the customer connects to the system via VXML browser 128 from a cellular telephone, a Laptop computer, or a PC. System browser 126 provides the IVR functionality and is connected to VAS 121. VAS 121 feeds VXML scripts to VXML browser 126 that can be rendered as synthetic computerized speech and played to the customer through the telephone or through the computing system if a speaker and audio system is provided to the accessing device.

CTI monitor 127 provides agent VXML browser 124 and more specifically RI 125 with interaction state information of one or more callers connected to VXML system browser 126. In one option an agent operating browser 124 can redirect the caller to a chat room hosted by a chat server. In this case, the chat room replicates essentially the same general dialog as the IVR system and the VXML script from VAS 121 is sent to VXML browser 124 for interpretation and rendering.

VXML browser 124 may interpret the VXML script and may download XSLT script from XSLT server 120. The XSLT script is used to convert the VXML via the language transformation engine (LTE) 302 into XHTML for use as the agent dialog in the chat room. The customer operating from browser 128 may opt to text interact or voice interact with the chat dialog. Customer browser 128 has text-to-speech capability and voice-to-text capability. XHTML (chat agent dialog) can be converted back into VXML with XSLT script at LTE 302 in browser 128 and the VXML may be interpreted by the voice engine and rendered as synthetic voice to the customer. The customer may speak to respond to speech or text chat dialog (XHTML) and the VXML may be converted in LTE 302 by XSLT to text for submission to the chat. XHTML may be rendered for send to the chat interface to appear to customers as a dialog of the agent. The customer may upload the XHTML and may use XSLT to render the chat dialog as spoken voice heard through the accessing devices audio system.

An agent operating VXML browser 124 and monitoring interaction state may identify several potential customers that could join the chat and redirect each of them to the chat room if given permission be the customer. In another use case the agent may redirect an IVR caller to a conference bridging facility illustrated herein as Conference Bridge 502. Bridge 502 represents a multi-party voice conference that accommodates a few or more callers.

In this case VXML from VAS 121 is sent to the agent VXML browser 124. Browser 124 gets XSLT from XSLT server 120. The resulting XHTML script is displayed for the agent and can be used as a visualized script that the agent can read to the conference participants. Using this method, script might be designed more or less for reminding the agent of topics to discuss or other notes where the agent also contributes his or her own voice content. In this case redirected callers are now connected into the conference bridge through their voice-enabled browsers however, an option to switch to telephone for the conference interaction may be available from within the customer's browser.

It will be apparent to one with skill in the art that the VXML visualization system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. In a contact center, a routing interface for enabling redirection of interactions from one scripted resource type to another comprising:
    a language transformation engine executable from a Web site connected to a voice extensible markup language based browser application resident on a digital medium installed on or accessible to a computing appliance; and
    an interactive panel accessible through the browser application, the panel containing selectable modality options;
    characterized in that the language transformation engine has network access to a language server, and a routing strategy server, and wherein VXML scripts downloaded to the browser are transformed into scripts expressed in another markup language for presentation and wherein the transformed scripts are used at an end resource to which the interaction is redirected.

2. The routing interface of claim 1 wherein a voice application server is connected to the voice extensible markup language based browser.

3. The routing interface of claim 1 wherein the end resource type is an agent connected to the browser through a computing appliance interface.

4. The routing interface of claim 1 wherein the resources include but are not limited to communication protocols including live voice, synthesized voice, chat, instant messaging, and voice conference.

5. The routing interface of claim 1 wherein the language server is an extensible style sheet language transformation (XSLT) server.

6. The routing interface of claim 1 wherein the interface further includes an event notification window for indicating when a resource type switch should take place for an event in progress.

7. The routing interface of claim 1 wherein the language transformation engine is further configurable to access pre-transformed dialog scripts and to dynamically convert candidate scripts using available construct library.

8. The routing interface of claim 1 wherein the final routing destination includes but is not limited to an agent telephone, an agent chat, a conference bridge, or an instant messaging interface.

9. A method for dynamically transforming a voice extensible markup language script into a script expressed in another compatible markup language, selection thereof triggered by required modality at the time of transformation comprising the steps:
 (a) downloading from a voice server the voice extensible markup language script using an extensible markup-enabled browser;
 (b) downloading from an extensible style sheet language transformation server, a corresponding extensible style sheet language transformation script using the extensible markup-enabled browser, which defines the desired end language and has access to the dialog constructs for that end language; and
 (c) within the extensible markup-enabled browser, using the extensible style sheet language transformation script to transform the voice extensible markup language script into a script expressed in the desired extensible markup-based language and the correct dialog constructs are transformed and the dialog specific constructs in the original script are ignored.

10. The method of claim 9 wherein in step (a) the extensible markup-enabled browser is also voice-enabled and is interacted with by a person using a telephone and the voice server is an interactive voice response server.

11. The method of claim 9 wherein in step (a) the extensible markup-enabled browser is an agent browser interacted with by an agent using a computing device.

12. The method of claim 9 wherein in step (c) the desired extensible markup-based language is extensible hypertext markup language.

* * * * *